United States Patent
Carmignani et al.

[11] Patent Number: 5,738,495
[45] Date of Patent: Apr. 14, 1998

[54] DEVICE FOR CONTOLLING THE WATER PRESSURE AND FLOW IN A WATER SUPPLY UNIT

[76] Inventors: Claudio Carmignani, Via della Chiesa Trav. I; Ugo Ciurlo, Via di Moriano 1625, both of Lucca, Italy, 55100; Luciano Maruni, Via di Campagna La Rotta, 76 Pontedera, Italy; Martin Nimbach, Oscar-von-Miller-Strass 26, 86956 Schongau, Germany; Luca Pinoli, Via Egola, 15, S. Miniato, Pisa, Italy

[21] Appl. No.: 722,100
[22] Filed: Nov. 18, 1996

[30] Foreign Application Priority Data

Feb. 2, 1995 [DE] Germany ............ 195 03 403.1

[51] Int. Cl.⁶ .................................. F04B 49/06
[52] U.S. Cl. .............. 417/44.1; 417/20; 417/44.2; 417/43
[58] Field of Search ........... 417/17, 20, 38, 417/44.1, 44.2, 43; 137/486, 565; 73/861.77, 261

[56] References Cited

U.S. PATENT DOCUMENTS

| | | | |
|---|---|---|---|
| 3,973,877 | 8/1976 | Taki | 417/38 |
| 4,124,332 | 11/1978 | Nishijyo | 417/26 |
| 4,344,741 | 8/1982 | Taki | 417/28 |
| 4,848,097 | 7/1989 | Roberts | 417/44.1 |
| 5,139,044 | 8/1992 | Otten et al. | 137/80 |
| 5,464,327 | 11/1995 | Horwitz | 417/43 |
| 5,580,221 | 12/1996 | Triezenberg | 417/44.2 |

FOREIGN PATENT DOCUMENTS

| | | |
|---|---|---|
| 2690525 | 10/1993 | France . |
| 3817018A1 | 11/1989 | Germany . |
| 2283925 | 5/1995 | United Kingdom . |

*Primary Examiner*—Timothy Thorpe
*Assistant Examiner*—Yuan M. Thai
*Attorney, Agent, or Firm*—Langen & Langen, P.A.

[57] ABSTRACT

A device for constant, automatic regulation of water pressure and flow in a water supply plant, comprising an electric pump fitted in the main water pipe, an adjustable pressure switch connected to the main water pipe, and an electronic control unit, which switches the pump on if the pressure falls short of a predetermined level or switches it off if a predetermined pressure level is exceeded. The device is characterized in that a turbine, incorporated in the water pipe, acts as a sensor, cooperating with a rotation signal transmitter which is connected to the electronic control unit in order to keep the pump switched on as long as the sensor detects a flow of water.

4 Claims, 1 Drawing Sheet

DEVICE FOR CONTOLLING THE WATER PRESSURE AND FLOW IN A WATER SUPPLY UNIT

FIELD OF THE INVENTION

Control devices for automatically and constantly controlling the water pressure and the water flow in a water supply system.

BACKGROUND OF THE INVENTION

Existing devices of this type use a differential pressure switch, resulting in frequent switching on and off of the pump due to the pressure switch's relative insensibility and therefore resulting in a pulsing water flow and disturbing noise. The problem solved by this invention is to provide an improved device of the above type producing an automatic and constant control of the water pressure and water flow.

SUMMARY OF THE INVENTION

A device for constant, automatic regulation of water pressure and flow in a water supply plant, comprising an electric pump fitted in the main water pipe, an adjustable pressure switch connected to the main water pipe, and an electronic control unit, which switches the pump on if the pressure falls short of a predetermined level or switches it off if a predetermined pressure level is exceeded. The device is characterized in that a turbine, incorporated in the water pipe, acts as a sensor, cooperating with a rotation signal transmitter which is connected to the electronic control unit in order to keep the pump switched on as long as the sensor detects a flow of water.

BRIEF DESCRIPTION OF THE DRAWINGS

Preferred embodiments of the apparatus of this invention will be described in detail below in connection with the following drawing: is

DETAILED DESCRIPTION OF THE PREFERRED EMBODIMENT

Figure 1:
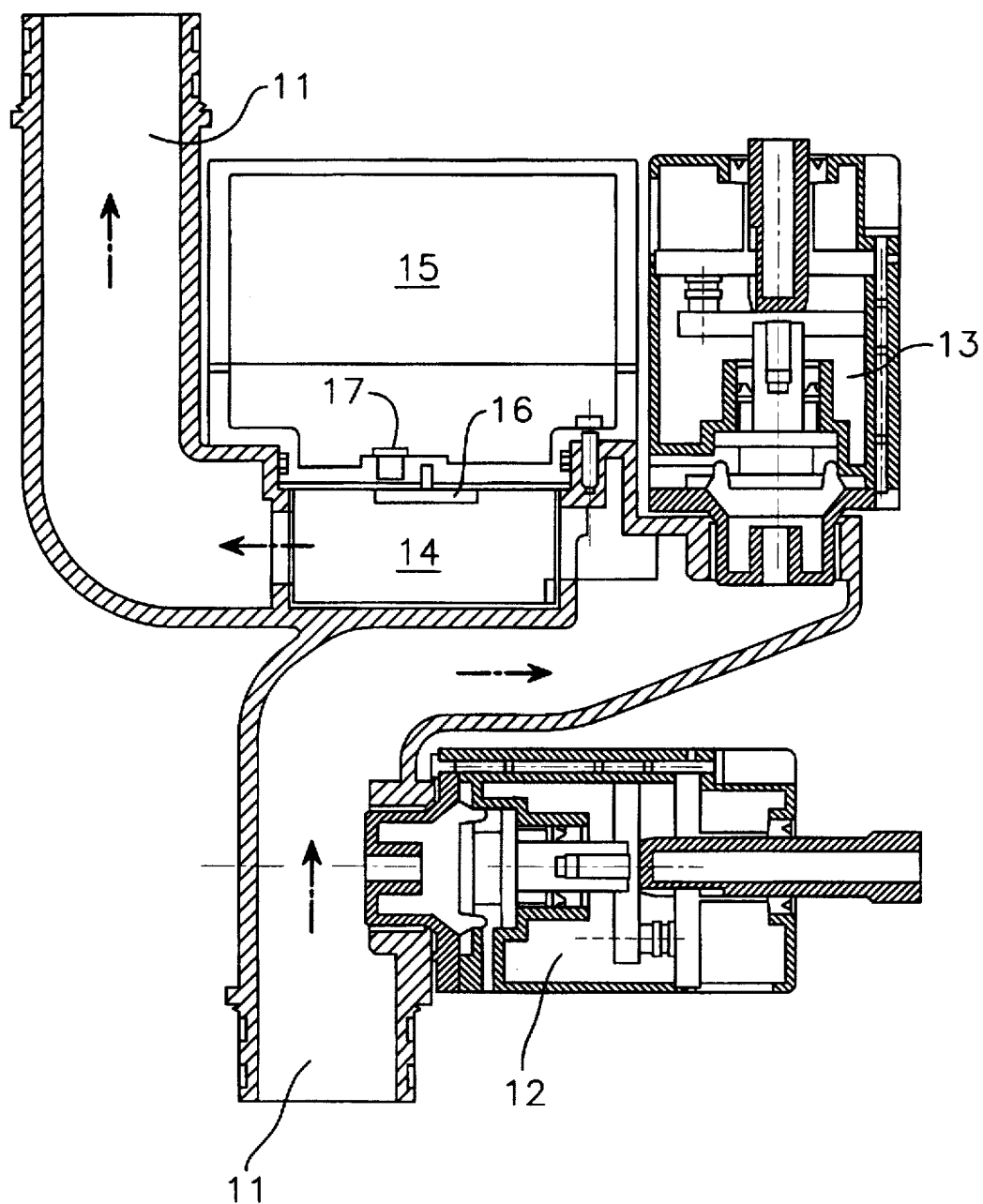
FIG. 1 is a cross section through a pump assembly comprising the control device of the present invention.

By using a turbine, switching on and off operations of the pump are avoided, regardless of the admissible pressure ranges, since the turbine is also driven by a low water flow, and the pump remains switched on also in case of low water use. A water wheel may be used instead of a turbine, as are usually incorporated in a water meter.

A preferred embodiment of the invention will be explained in detail hereinafter with reference to the drawing showing a schematic cross sectional view of a part of the device according to the invention.

Referring to FIG. 1, water flows through an electric pump (not shown) and a one-way valve (not shown) at the bottom of the drawing in a water main 11 of a water supply system and leaves the system on top into a pipe system (not shown) connected with several users.

An adjustable pressure switch 13 is connected with water main 11 which switches an the pump at a minimum pressure of for example 1.5 to 2 bar to establish the necessary pressure. When water is drawn off a turbine 14 connected into the water main 11 is energized. The rotation of the turbine is signalled through a rotary signal unit comprising a magnet 16 supported on the turbine shaft and a stationary magnetic field sensor to an electronic control unit 15 keeping the pump switched on until the turbine 14 acting as a flow sensor detects water use. The advantage of the turbine mainly lies in the fact that it responds to very low water use and that therefore the operation of the pump is controlled as desired. A minimum pressure switch 12 may be connected with water main 11 switching off the pump in case of need to avoid a running dry of the pump when the pressure falls below a minimum pressure of for example 0.5 to 1 bar.

Instead of this minimum pressure switch 12 the electronic control unit may be arranged such that the pump switches off after a predetermined time period during which the pressure adjusted on the pressure switch 13 falls below an adjusted pressure. This time period may be approximately 5 seconds.

A maximum pressure value does not need to be considered because it the pump's nominal pressure will match the system's maximum permitted pressure.

What is claimed is:

1. A control device for automatically and constantly controlling the water pressure and the water flow in a water supply system comprising:

an electronic pump connected to a water main;

a pressure switch connected to said water main and an electronic control system, said switch switching on said pump if the pressure falls below a predetermined value measured in a turbine connected with said water main and acting as a flow sensor in conjunction with a rotary signal detector and transmitter connected to said electronic control system, whereby said pump is kept in operation after said switching on as long as said flow sensor senses water flow.

2. The control device of claim 1 wherein said rotary signal transmitter further comprises a magnet connected to said turbine and a magnetic field sensor proximal said turbine.

3. The control device of claim 2 further comprising a minimum pressure switch connected to said water main.

4. The control device of claim 2 wherein said electronic control system switches off the pump after a predetermined time period if the pressure falls below an adjusted minimum pressure value.

* * * * *